United States Patent [19]
Schweitzer et al.

[11] Patent Number: 5,850,450
[45] Date of Patent: Dec. 15, 1998

[54] METHOD AND APPARATUS FOR ENCRYPTION KEY CREATION

[75] Inventors: Peter Schweitzer, Watertown, Mass.; Stephen M. Curry, Dallas, Tex.; Wendell L. Little, Denton, Tex.; Bryan M. Armstrong; Christopher W. Fox, both of Dallas, Tex.; Donald W. Loomis, Coppell, Tex.

[73] Assignee: Dallas Semiconductor Corporation, Dallas, Tex.

[21] Appl. No.: 690,272

[22] Filed: Jul. 19, 1996

Related U.S. Application Data

[60] Provisional application Nos. 60/001,277 Jul. 20, 1995; 60/001,278 Jul. 20, 1995 and 60/000,279 Jul. 20, 1995.

[51] Int. Cl.⁶ .................................................. H04L 9/00
[52] U.S. Cl. .......................................................... 380/30
[58] Field of Search ................. 380/3–5, 30; 364/717.01

[56] References Cited

U.S. PATENT DOCUMENTS

| | | | |
|---|---|---|---|
| 4,405,826 | 9/1983 | Rivest et al. | 380/30 |
| 4,633,388 | 12/1986 | Chiu | 380/4 |
| 4,764,959 | 8/1988 | Watanabe et al. | 380/4 |
| 4,780,840 | 10/1988 | Van Den Ende | 364/717.01 |
| 4,823,308 | 4/1989 | Knight | 380/4 |
| 4,853,884 | 8/1989 | Brown et al. | 364/602 |
| 4,933,898 | 6/1990 | Gilberg et al. | 380/3 |
| 5,045,675 | 9/1991 | Curry | 235/441 |
| 5,068,894 | 11/1991 | Hoppe | 380/23 |
| 5,117,380 | 5/1992 | Tanagawa | 364/717 |
| 5,228,084 | 7/1993 | Johnson et al. | 380/23 |
| 5,323,338 | 6/1994 | Hawthorne | 364/717 |
| 5,559,889 | 9/1996 | Easter et al. | 380/30 |
| 5,563,950 | 10/1996 | Easter et al. | 380/30 |
| 5,568,552 | 10/1996 | Davis | 380/4 |

OTHER PUBLICATIONS

"Soft Microcontroller Data Book"; Oct. 6, 1993; Dallas Semiconductor; Dallas, US, *see pp. 1 through 3*, *see p. 7*, *see p. 8*, see p. 73*, *see pp. 77 through 80*, *see p. 82*, *see p. 229*, *see pp. 290 through 292*.

Bill Morton, *The Beginner's Guide To Pretty Good Privacy*, Version 1.1 (Apr. 13, 1995).

*How PGP Works and the Maths Behind RSA*, Internet article http://rschp2.anu.edu.au:8080/howpgp.html.

James Nechvatal, *Public–Key Cryptography*, Security Technology Group, National Computer Systems Laboratory, National Institute of Standards and Technology, Gaithersnburg, MD 20899, Dec. 1990.

*Primary Examiner*—Salvatore Cangialosi
*Attorney, Agent, or Firm*—Jenkens & Gilchrist, P.C.

[57] ABSTRACT

A portable electronic data module for secure transactions, the electronic data module having a random number generator and an optimized co-processor for producing unbreakable key sets for a two-key cryptosystem. A real-time clock is sampled depending upon an external random event series such as power-ups of the data module by a host apparatus, and based upon the contents of the sample thus obtained, the entropy of a previously-loaded accumulator is further enhanced to achieve a pool of true random numbers. By repeatedly requesting random bytes of information from said pool of random numbers, large random numbers are created which are then rendered prime and used for key set creation.

10 Claims, 13 Drawing Sheets

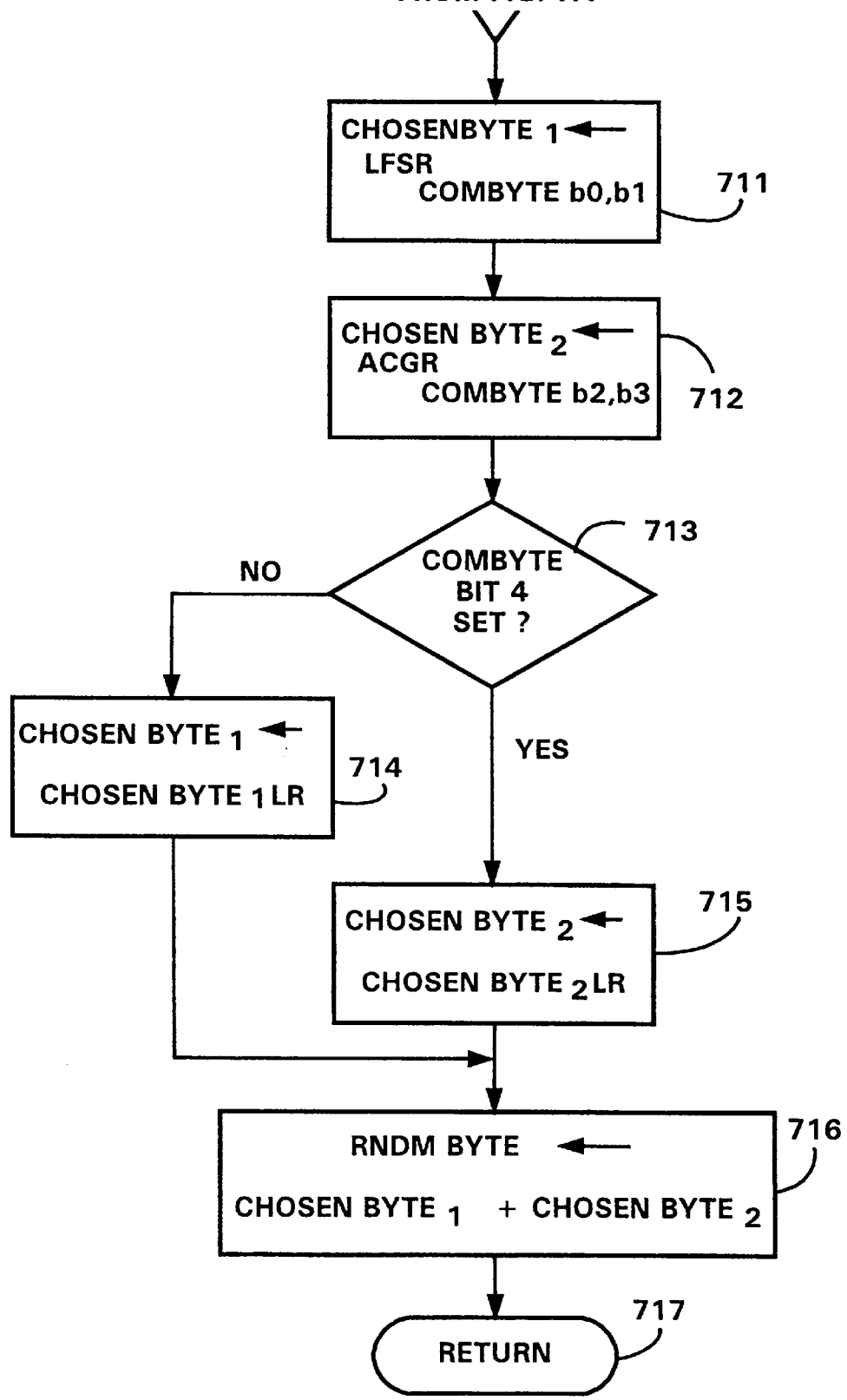

METHOD AND APPARATUS FOR ENCRYPTION KEY CREATION

PRIORITY UNDER 35 U.S.C. §119(e) & 37 C.F.R. §1.78(a)

This nonprovisional application claims priority based upon the following prior U.S. Provisional Patent Applications: (i) entitled "Method And Apparatus For Encryption Key Creation," Ser. No.: 60/001,277 (Attorney Docket Number 20661/00421), filed Jul. 20, 1995, in the names of Wendell Little and Stephen Curry; (ii) entitled "Microcircuit With Memory That Is Protected by Both Hardware and Software," Ser. No.: 60/001,279 (Attorney Docket Number 20661/00420), filed Jul. 20, 1995, in the names of Wendell Little, Rick Fieseler, Steve Hass, and Brad Harrington; (iii) entitled "Single Chip Microprocessor, Math Co-Processor, Random Number Generator, Real-Time Clock, and RAM Having A 1-Wire Interface," Ser. No.: 60/001,278 (Attorney Docket Number 20661/00423), filed Jul. 20, 1995, in the names of Wendell Little and Andreas Curiger.

CROSS-REFERENCE TO RELATED APPLICATIONS

This application hereby incorporates by reference the following co-assigned patent applications, concurrently filed herewith, which describe related subject matter:

| Serial No./ Docket No. | Title | Inventor(s) |
| --- | --- | --- |
| 08/684,644, now pending | Microcircuit With Memory That Is Protected By Both Hardware And Software | Little, et al. |
| 09/094,165, now pending | Single Chip Micro Processor, Math Co-Processor, Random Number Generator, Real-Time Clock, and RAM Having A 1-Wire Interface | Little, et al. |
| 08/683,937, now U.S. Pat. No. 5,832,207. | Secure Module With Microprocessor And Co-Processor | Little, et al. |

BACKGROUND OF THE INVENTION

1. Technical Field of the Invention

The present invention relates to secure portable data carriers and, in particular, to a method and apparatus for creation of keys used in an asymmetric encryption scheme incorporated in an electronic data module.

2. Description of Related Art

Cryptography deals with the transformation of text ("plaintext") into coded form ("ciphertext") by encryption, and transformation of ciphertext into plaintext by decryption. Normally these transformations are parameterized by one or more keys. The motive of encrypting text is security for transmissions over insecure channels.

Three of the most important services provided by cyptosystems are secrecy, authenticity, and integrity. Secrecy refers to denial of access to information by unauthorized individuals. Authenticity refers to validating the source of a message, that is, that the message is transmitted by a properly identified sender and is not a replay of a previously transmitted message. Integrity refers to assurance that a message was not modified accidentally or deliberately in transit, by replacement, insertion, or deletion. A fourth service of increasing prominence, which may be provided, is nonrepudiation of origin, that is, protection against a sender of a message later denying transmission.

Classical cryptography deals mainly with the secrecy aspect. More recently, however, two new trends have emerged: (a) authenticity as a consideration which rivals and sometimes exceeds secrecy in importance, and (b) the notion that some prespecified portion of a key need not be secret.

The first trend has arisen in connection with applications such as electronic mail systems and electronic transfer of funds. In such settings, an electronic equivalent of the handwritten signature may be desirable. Also, since intruders into a system often gain entry by masquerading as legitimate users, cryptography presents an alternative to password systems for access control.

The second trend addresses the difficulties which have traditionally accompanied the management of secret keys. Conventional cryptosystems, also known as "symmetric" encryption systems, require that there be a single secret key shared by a pair of users. In these methods, therefore, the security and authenticity are provided only to the extent that the single key is known to both users and is kept secret. One of the well-known examples of a conventional cryptosystem is the Data Encryption Standard ("DES"). It can be appreciated that because of the requirements of prior exchange of the key and two-party secrecy, the conventional cryptosystems have not been found to be very useful in applications such as electronic commerce.

Public-key systems, also called two-key or asymmetric cryptosystems, differ from conventional systems in that there is no longer a single secret key shared by a pair of users. Rather, each user has his own key set. Furthermore, the key set of each user comprises two portions: a private component and a public component. If a plaintext message is denoted by M, then the public component generates a public transformation of the message, E, whereas, the private component generates a private transformation, D. Using conventional cryptological terminology, E and D might be termed encryption and decryption functions, respectively. However, it should be noted that this is imprecise: in any given cryptosystem it may be possible to have $D\{E\{M\}\}=M$; $E\{D\{M\}\}=M$; or both.

A useful requirement of two-key cryptosystems is that E must be a trap-door one-way function. That is, E should be easy to compute from the public key material but hard to invert unless one possesses the corresponding D, or equivalently, the private key material. To support both secrecy and authentication, the transformations of a public-key system must satisfy $D\{E\{M\}\}=M=E\{D\{M\}\}$. One of the most versatile public-key cryptosystems that satisfies this relationship is the Rivest-Shamir-Adelman ("RSA") scheme.

Although two-key cryptosystems overcome some of the problems associated with conventional one-key systems that have curtailed their wide-spread use, the use of two-key systems has not proliferated in applications such as large-scale electronic commerce because currently there is no feasible solution that combines secrecy, authentication, integrity and attack-immunity in a single individualized portable solution that maximizes user convenience. As is well-known in the art, to use a public key system such as the RSA system, a user must first choose two large random prime numbers, P and Q. These numbers are then used in computing a Modulus, N (N=P times Q). Subsequently, a private exponent, D, and a public exponent, E, are computed according to known techniques. To survive intruder attacks on ciphertext with a high degree of reliability, both E and D are required to be large and random. Therefore, any secure transaction solution that proposes to implement a known public key system such as the RSA system must at least be able to generate large random numbers that are prime such that (i) the random numbers are truly "random," that is, there is virtually no predictability of the numbers, and (ii) computations, modular arithmetic or otherwise, necessary for implementing the cryptosystem are not so time-consuming as to render the the solution practically useless, and (iii) the portability aspect of the solution is not compromised.

Although various random number generators and modular arithmetic techniques have been extant for sometime, no portable secure transaction solution incorporating a public key system such as the RSA system is known to have all of the advantages and novel features of the present invention described, and claimed, hereinbelow.

SUMMARY OF THE INVENTION

The present invention generates a truly unique, random number in a clandestine secretive environment so that no one can access the number. The numbers are created and stored within a highly protected microcircuit wherein the circuitry is not accessible. In one aspect of the present invention, the random, unique number may also be a concatenation of a unique number, which is preferably 56 bits long, with a random number, which is 1024–56 bits long (968 bits long).

The unique number can be created a variety of ways. In the preferred embodiment of the present invention, the unique number can be stored in a permanent manner in the circuitry of the exemplary embodiment of the present invention. Preferably the unique number is laser etched into a memory circuit.

In one embodiment of the present invention, the unique number may be concatenated to a random number such that the unique number comprises the least significant bits of the 1024 bit unique, random number.

It is noted that generally, when creating an RSA key set, one generates two random, odd numbers then adds two to each number repeatedly, if necessary, until they are both prime numbers. The two prime numbers are then multiplied together to produce the 1024 bit number that is part of the RSA public encryption key. (Optionally, additional tests can be performed on the two prime factors to insure that they are "good" primes, such that primes which fail the additional tests can be disregarded.) Therefore, in one exemplary embodiment of the present invention, to generate a 1024 bit RSA key, one first concatenates the 56 bit unique registration number with the 968 bit random number to produce a unique random number, with the 56 bit unique number as the upper, most significant, bits and the 968 bit random number as the lower or least significant bits. This number should be split approximately in half, the two halves should be made odd, and the two halves should be tested for primality and incremented by two as necessary until they are both prime. As long as the 56 bits of the unique number in the most significant bit position of one of these two primes, P and Q, is unchanged by the incrementing process, then the product of these two primes creates a public key which will also be unique. It is understood that it is extremely improbable that the process of incrementing by two until a prime is reached will alter the most significant 56 bits. In the unlikely event that this were to happen, the process should simply be tried again.

In a further aspect, the primes, P and Q, may be generated without regard to a unique number. After calculating the product of the primes, N, which is part of the public key, it is also necessary to choose and make public the number E, which may preferably be a large number. E can also be a small number such as 3 or 65537. These are popular choices because they speed up the mathematical portion of the encryption process. It is, therefore, not essential that E be a large number. Having chosen E and knowing the two prime factors which were multiplied to get N, then the secret key, D, can be calculated by a well defined and rapid mathematical process. It is not practical at all to determine D if only E and N are known.

The exemplary embodiment and method is capable of producing a true random number and then using that random number to create new truly random numbers ("on the fly").

The present invention, in one exemplary embodiment, provides a crystal oscillator that is operable at a preselected operating frequency. Further, in the exemplary embodiment the frequency is approximately 32 KHZ. The crystal oscillator is connected to a series of counters. Preferably, the first counter is an 8-bit counter. Other counters can be incorporated into the circuit thereby establishing a real-time clock. In the preferred exemplary embodiment the crystal oscillator and counter circuitry are always running. That is, once the microprocessor circuit is manufactured and the oscillator circuitry is connected to a battery, the oscillator is not disconnected from the battery for the entire life of the product.

Conversely, the microprocessor portion of the circuit can be powered up and down by transmitting power from a host system to the exemplary embodiment. The microprocessor can communicate with the host system via a one-wire interface.

Referring to the counter circuitry, the 8-bit counter of the real time clock cannot be turned off. As a result, there is a continuous stream of data at the outputs of the 8-bit counter whether the microprocessor is powered up or not. As long as there is a battery connected to the circuit the real time clock will run continuously. It is noted that a memory circuit is also powered by the battery so that memory data is maintained while the microprocessor is not powered up.

If the microprocessor is subjected to a power-up and power-down at indeterminate intervals, from time to time, the output of the 8-bit counter could be sampled each time the microprocessor is powered up. As long as the count at the outputs of the 8-bit counter and the powering up and down of the microprocessor are uncorrelated to each other then a truly random 8-bit number will be at the outputs of the 8-bit counter. This number can be stored as a portion of a first random number in memory. The first 8-bit random number can remain in memory while the microprocessor is powered down. Upon powering up the microprocessor again a second random number can be acquired from the 8-bit counter and concatenated to the first 8-bit random number. This process can continue until a random number having a predetermined bit length is created. In one embodiment the predetermined random number is 968 bits long. Thus, the microprocessor must be powered up and down 121 times to create enough 8-bit numbers to be concatenated into a 968-bit number.

A quantum mechanical or other naturally random technique, exterior to the microprocessor circuitry, can be used to randomly power up and power down the microprocessor. For example the microprocessor could be powered up in accordance with peak electromagnetic wave signals from outer space. In a nutshell, the truly random number is created by the asynchronous relationship between powering up and down the microprocessor and the output of the 8-bit counter running at 32 KHZ.

Another aspect of the exemplary encryption key generation apparatus is its ability to create new random numbers from the originally created random number by simply applying known mathematical properties of large math to the original random number. Thus, the apparatus can generate new public and private keys when requested to do so. The new random numbers can be concatenated to the unique number, as described above, thereby creating new unique, random numbers that can uniquely identify someone or something.

In a yet another aspect, the present invention provides an electronic data module having an accumulator wherein the contents thereof are first seeded with at least one clock sample. By multiplying the seed value by a pre-selected set of prime numbers, the contents of the accumulator are then expanded to a pre-determined size. Randomization is admixed into the accumulator contents by performing a series of cyclic redundancy check ("CRC") operations and bit-level manipulations that are uncorrelated to program cycle times. The contents are randomized further by using clock samples that are uncorrelated to an external event such as a power-up of the electronic data module. The large random prime numbers, P and Q, are then generated by using random bytes of a pre-selected sub-group of the contents of the accumulator. After computing the modulus, a first exponent and a second exponent are computed in a known manner. Thereafter, one of the two exponents is privatized and stored in a secure memory, thereby rendering it the private-key component such that access thereto is prohibited.

In a still further embodiment, the present invention comprises a plurality of memory locations for storing information; a first structure for generating information, said information being loadable into said plurality of memory locations; a second structure for increasing entropy of the contents of a sub-group of said plurality of memory locations; and, a third structure for providing a segment of information upon demand, the segment of information being obtained from the contents of the sub-group of the plurality of memory locations. Further, the first structure further comprises a cyclic redundancy check generator; and a real-time clock, having at least one 8-bit counter, wherein said at least one 8-bit counter provides at least one sample of information to said cyclic redundancy check generator.

In a yet further embodiment, the present invention relates to a method of generating an two-key encryption key set comprising a private component and a public component, the method comprising the steps of: generating a first random prime number; generating a second random prime number; producing a modulus by multiplying said first random number by said second random prime number; generating a first exponent by solving a first modular arithmetic equation; generating a second exponent which is a modular inverse to said first exponent, by solving a second modular arithmetic equation; and securely storing either the first exponent or the second exponent in at least one memory location.

BRIEF DESCRIPTION OF THE DRAWINGS

A more complete understanding of the method and apparatus of the present invention may be had by reference to the following Detailed Description when taken in conjunction with the accompanying Drawings wherein:

FIGS. 7A and 7B depict an exemplary flow chart comprising steps for a random byte request;

DETAILED DESCRIPTION OF THE DRAWINGS

Figure 1:
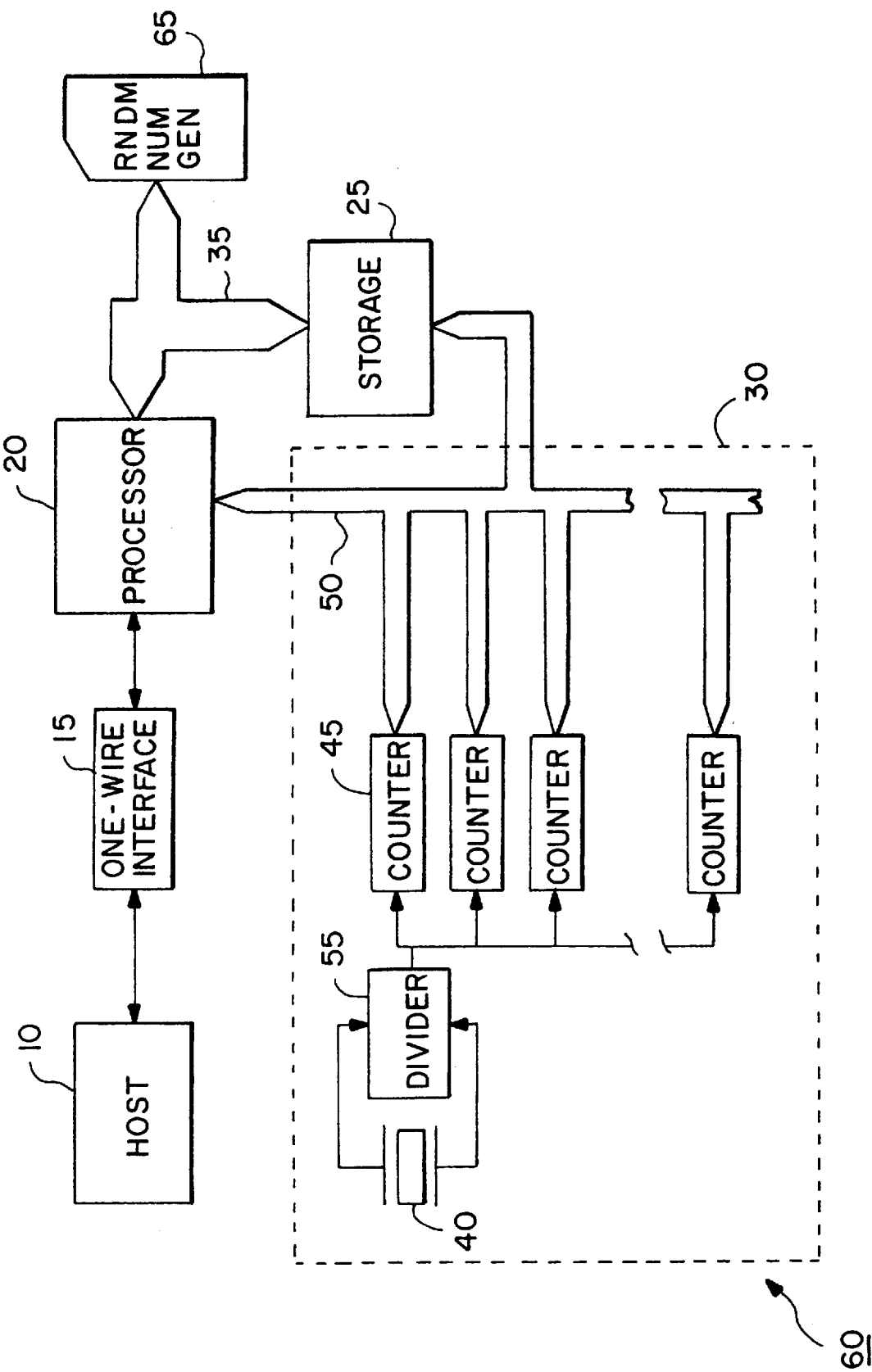
FIG. 1 is a block diagram depicting an arrangement between a sample-able real-time clock and a processing block having a one-wire interface in accordance with the present invention.

Referring now to the Drawings wherein like or similar elements are designated with identical reference numerals throughout the several views, and wherein the various elements depicted are not necessarily drawn to scale, and more particularly to FIG. 1, reference numeral 60 refers to a block diagram of an arrangement between a sample-able real-time clock 30 (or, a true time clock, as it is also known in the art; hence these terms will be used hereinafter synonymously and interchangeably) and a processing block 20 coupled to a one-wire interface 15 for communicating therethrough with a host or master 10. The real-time clock 30 is in data communication with the processor block 20 and a storage block 25 through a first bus 50. Further, the processor block 20 is in data communication with the storage block 25 and a random number generator 65 via a second bus 35. It is understood that the processor block 20 may preferably comprise a microprocessor, or a microcomputer, in addition to computation optimizers and accelerators such as, for example, a math co-processor. The storage block 25 may be any known type of memory, arranged in any known configuration. The storage block 25 may further be partitioned into sub-blocks such as, for example, data memory, program memory and special function registers and accumulators.

Continuing to refer to FIG. 1, the random number generator 65 serves in accordance with the teachings of the present invention to produce true random numbers that are prime and have extremely large magnitudes, preferably 512 bits or more in length. As will be seen hereinbelow in reference to FIGS. 4A et seq., the initialization portion of the random number generation process is coupled to the sampling of the real-time clock 30 via one of its plurality of clock counters, of which a clock counter is labeled as 45. The real-time clock 30 comprises at least one crystal oscillator 40, the output of which is provided to a divider block 55 that successively fractionalizes the frequency associated with the crystal oscillator 40. The successively fractionalized time outputs are provided to the clock counters, ranging from the least significant counter to the most significant counter, for example, the least significant clock counter 45. Although in the preferred embodiment of the present invention each these clock counters provides outputs of 8 bits of data, it is understood herein that clock counters providing outputs of different bit length, for example, 16 bits or 32 bits, may also be employed within the scope of the present invention. Further, it can be readily appreciated that the output of the least significant clock counter, for example, counter 45, varies most rapidly in comparison with the rest of the counters.

Still continuing to refer to FIG. 1, it can be further appreciated that the processor block 20, the random number generator 65, the storage block 25, the real-time clock 30 and the one-wire interface 15 may all preferably be integrated on a single monolithic semiconductor chip such that the chip may be conveniently encased in a portable electronic data module. The exemplary embodiments of such a monolithic semiconductor chip and its carrier are described hereinbelow in reference to FIGS. 2A, 2B, 2C and 3.

In an exemplary embodiment of the present invention, the sampling of the real-time clock 30 is coupled to the random event of power-up or power-down of the data module in which the semiconductor chip having the processor block 20 is disposed. In accordance with the teachings of the present invention, a power-up is defined to be the event in which the host 10 issues a command via the one-wire interface 15 to the processor block 20 to do something. What may be done by the processor block 20 in response to the command is designed to consume an indeterminate number of processor cycles so that inter-power-up durations are random. As will be seen below, such randomness in clock counter sampling will be 22 enhanced tremendously by the techniques provided in accordance with the teachings of the present invention. The increased entropy of the sampled data will then be used for creating attack-immune encryption keys suitable for such secure transactions as involving, for example, electronic commerce.

Figure 2A:
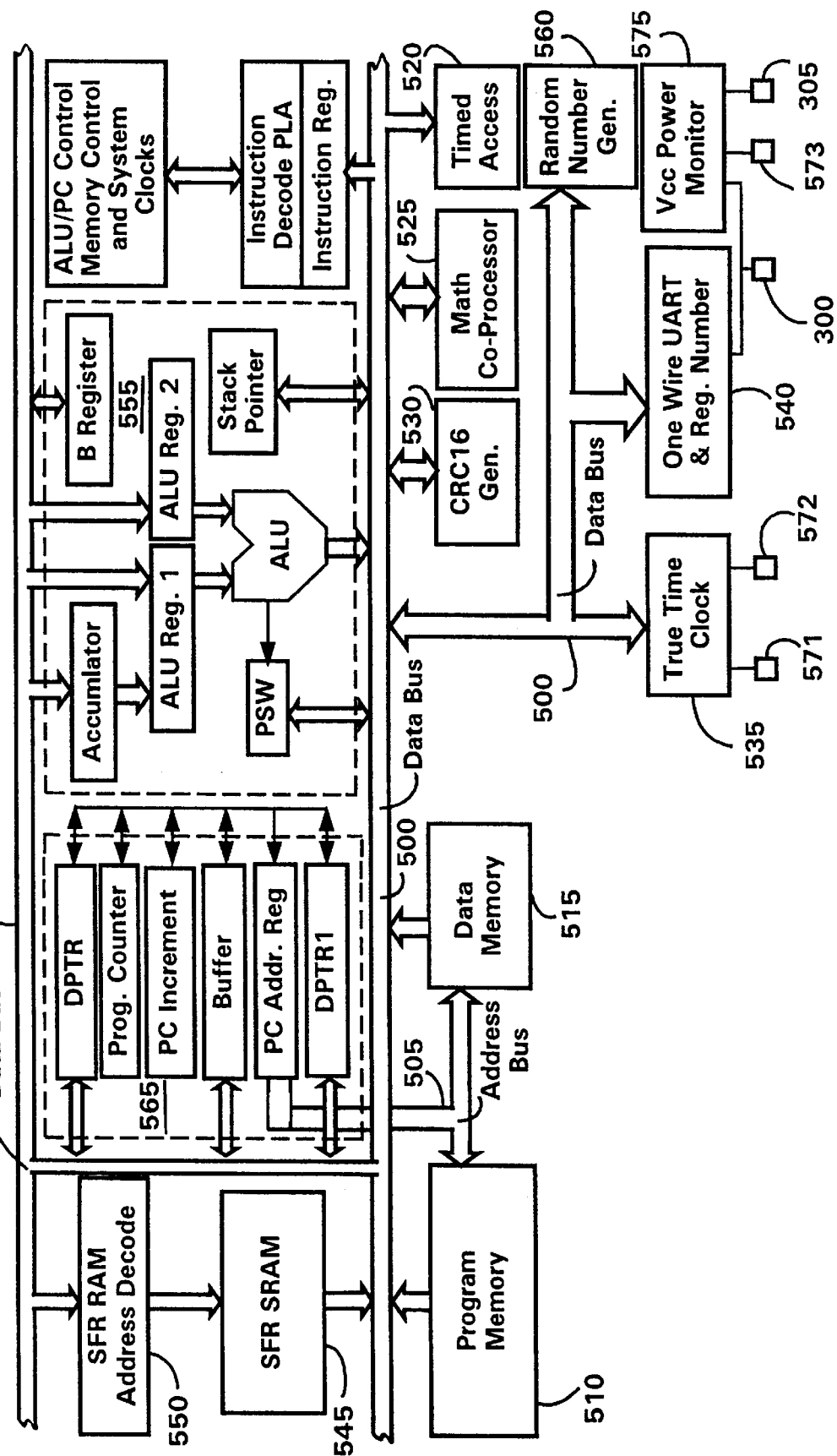
FIG. 2A illustrates a functional block of an exemplary embodiment of a monolithic semiconductor chip incorporating the teachings of the present invention.
Figure 2B:
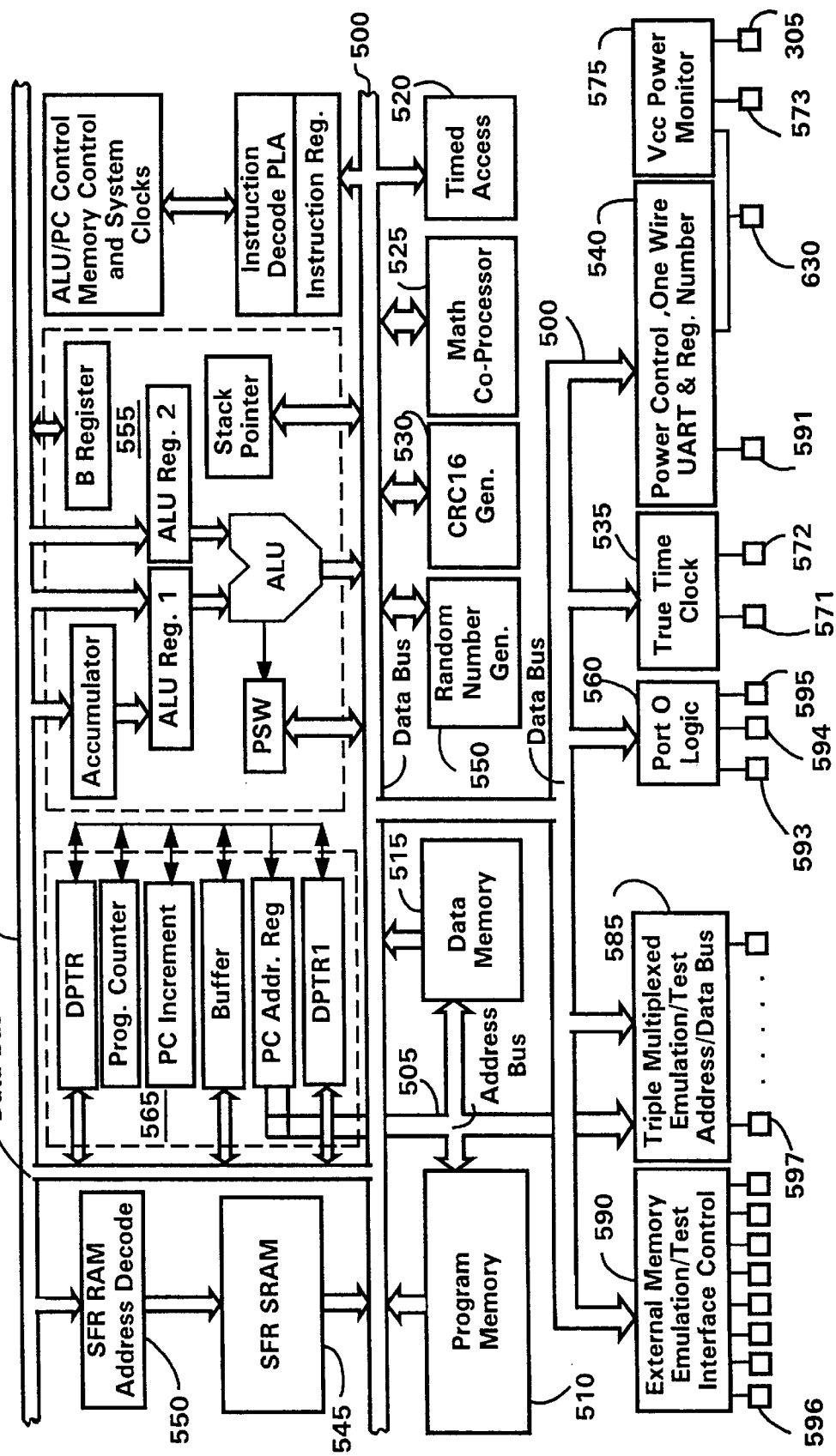
FIG. 2B illustrates a functional block of another exemplary embodiment of a monolithic semiconductor chip incorporating the teachings of the present invention.
Figure 2C:
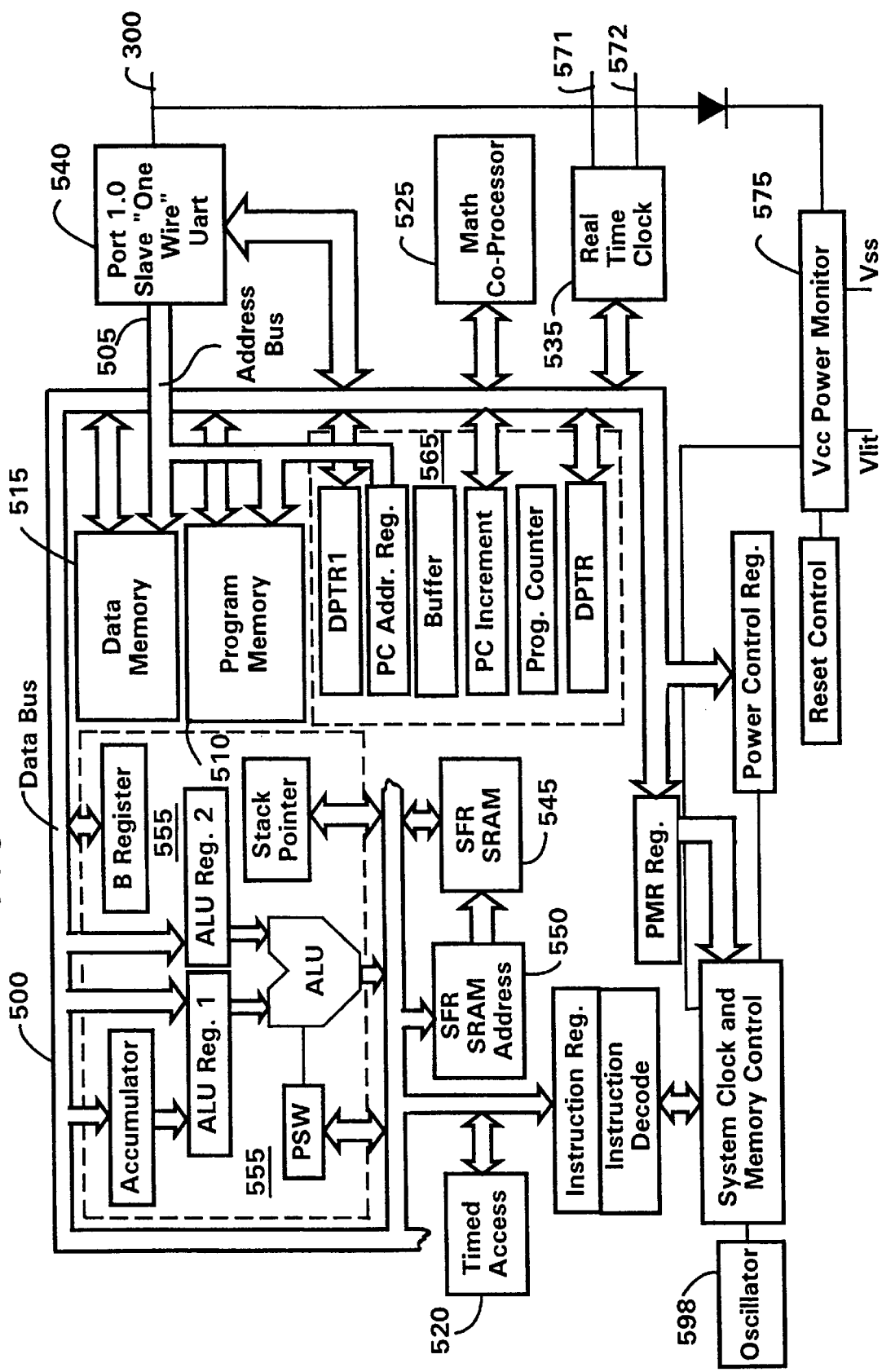
FIG. 2C illustrates a functional block of yet another exemplary embodiment of a monolithic semiconductor chip incorporating the teachings of the present invention.

FIGS. 2A, 2B, and 2C depict three architectural embodiments of a monolithic semiconductor chip 135 (shown in FIG. 3) in which the teachings of the present invention are incorporated. Broadly, the disclosed embodiments include a power monitor 575, a one-wire Universal Asynchronous Receiver and Transmitter ("UART") 540, a true time clock (or, a real-time clock) 535, a coprocessor 525, and a timed access block 520. Further, the exemplary embodiments also include a program/data pointer block 565 and an accumulator/arithmetic logic unit ("ALU") block 555 such that both blocks 565 and 555 are coupled to a data bus 500. Further, a program memory 510, which may preferably be of read-only-memory ("ROM") type, and a battery-backed nonvolatile data memory 515 are operably disposed on the data bus 500. An address bus 505 is provided for addressing the memory locations in the program memory 510 and the data memory 515. Also provided in each of the embodiments is a Special Function Register ("SFR") memory 545 that is decoded by an SFR decoder 550. It can be readily seen that the SFR decoder 550 is electrically connected to the data bus 500.

Continuing to refer to FIGS. 2A, 2B, and 2C, the true time clock 535 is connected to two crystals, 571 and 572. In a presently preferred implementation, the true time clock 535 comprises a 47-bit counter and two groups of byte-wide registers (not shown), one group for seconds and the other for subseconds. Preferably, the true time clock 535 is not programmable, but is designed to start from an all-zero point when enabled during the manufacturing of a product embodying the present invention. The true time clock 535 is further designed to provide an alarm that is used to establish an interrupt to the chip 135 (shown in FIG. 3) to indicate that the processor block 20(shown in FIG. 1) is directed to enter into a STOP mode and wait for a one-wire communication segment with the one-wire UART 540. Once the communication segment has been completed, the host 10 (shown in FIG. 1) will issue an interrupt/command to restart the processor block 20.

Figure 3:
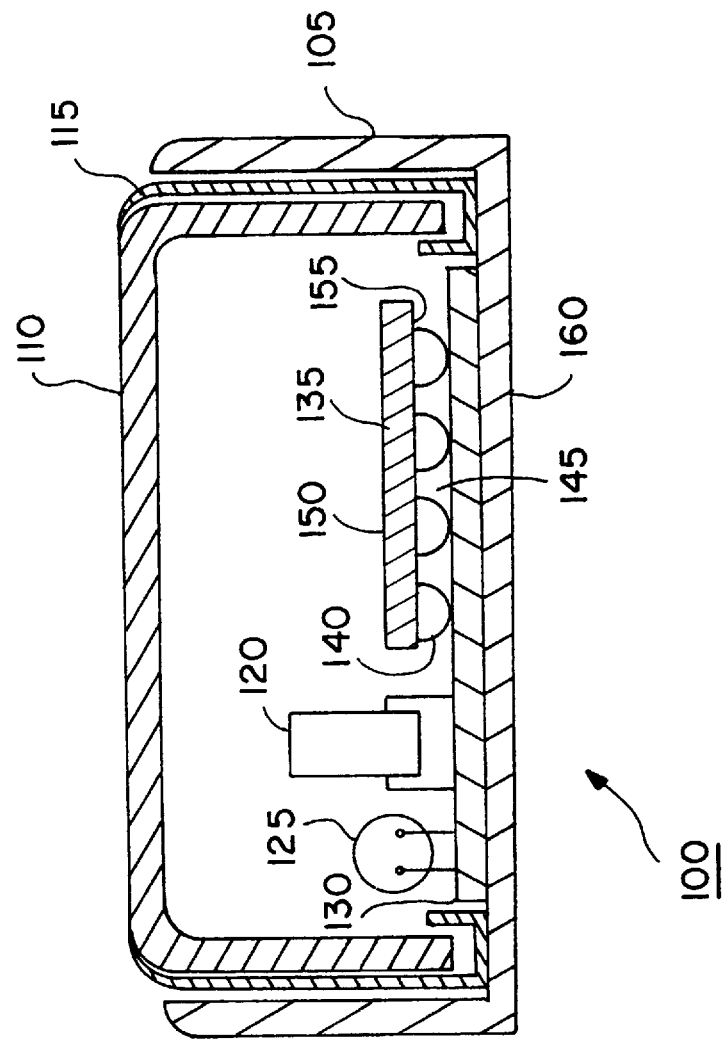
FIG. 3 is a cross-sectional view of an exemplary embodiment of a portable electronic data module that may be used for encasing a monolithic semiconductor chip incorporating the teachings of the present invention.

Still continuing to refer to FIGS. 2A, 2B and 2C, the timed access block 520, which is disposed on the data bus 500, is designed to provide system control verification of system functions which are considered vital to proper system-level operation of the semiconductor chip 135 (shown in FIG. 3). The purpose of the timed access block 520, in presently preferred implementation, is to guarantee that the processor block 20 (shown in FIG. 1) is under system software control when writing to specific SFR control bits.

The power monitor 575 monitors the presence of voltage internal to the chip 135 (shown in FIG. 3) in the electronic data module 100 (shown in FIG. 3). The internal voltage is referenced against an internal bandgap reference, Vrst, such that whenever the internal voltage falls below Vrst, a RESET signal is issued to halt any program code that is being executed at that time and place the processor block 20 (shown in FIG. 1), including the co-processor 525, in a STOP mode.

Referring now specifically to FIG. 2A and 2B, a cyclic redundancy check ("CRC") generator 530 and a random number generator 560 are operably disposed on the data bus 500. In presently preferred implementation, the CRC generator 530 is provided as a 32-bit CRC, although it can be appreciated that a 16-bit CRC may also be provided within the scope of the present invention. As is well-known in the art, the mechanism of memory verification of either the 16-bit CRC or 32-bit CRC is accomplished essentially in a similar manner.

Continuing now to refer to FIGS. 2A and 2B specifically, the random number generator 560 is implemented by utilizing the random power-up relationship of the electronic data module 100 for sampling the output of the true time clock 535. As the electronic data module 100 is subjected to a number of power-up and power-down conditions, the monolithic chip 135 in the electronic data module 100 will be able to accumulate a large collection of random values which can then be transmuted into a single random number having a large value, for example, a value that can be expressed as a 1024-bit long binary number. As will be seen below, such large random numbers will be operated upon by the co-processor 525 for creating necessary keys for encryption. It can be readily appreciated that since the mathematical numbers that will be used for the modular arithmetic computations by the co-processor 525 are so large that there is no chance that the numbers will repeat themselves.

The architectural embodiment depicted in FIG. 2B comprises an extension of the data bus 500 so that an emulation/test interface block 590, a multiplexed emulation address/data block 585 and a port logic block 580 are operably disposed thereon. The emulation/test interface block 590 is connected to a plurality of terminals or pads, for example, pad 596, for providing electrical control signals between an external emulation/test circuit (not shown) that may be used for testing and emulating external memory and the semiconductor chip 135 of the electronic data module 100 (shown in FIG. 3). The emulation address/data block 585 is preferably a 8-bit multiplexed bus for providing an address/data path therebetween, of which a single pad 597 is labeled. Further, the port logic block 580 is preferably provided with three port pins, 593, 594, 595, such that the semiconductor chip 135 may be externally connectable to other known compatible electronic devices in a known manner.

Referring now to FIG. 3, there is shown a cross-sectional view of a presently preferred exemplary embodiment of an electronic data module 100 having a semiconductor chip 135 that includes memory, a microprocessor/microcomputer, a real-time (or, true time) clock, a math co-processor, and a random number generator according to the teachings of the present invention. The electronic data module 100, which may be substantially token-shaped or button-shaped, is designed to hermetically house the monolithic semiconductor chip 135. A housing 160 of the electronic data module 100 preferably comprises a male conductive surface 110 and a female conductive surface 105 that are designed so that the male conductive surface 110 is inserted into the female conductive surface 105 which is lined with an insulator 115. In a presently preferred exemplary embodiment, both the female conductive surface 105 and the male conductive surface 110 comprise stainless steel surfaces.

The monolithic semiconductor chip 135 is preferably affixed to a substrate 130 by means of a plurality of solder bumps, for example, solder bump 140, such that a top passivated side 155 of the monolithic semiconductor chip 135 is positioned facing the substrate 130. According to the exemplary embodiment, a back side or bulk side 150 of the monolithic semiconductor chip 135 is preferably encapsulated with a conventional epoxy resin (not shown). Further, the gap 145 between the monolithic semiconductor chip 135 and the substrate 130 is also preferably filled with a conventional resinous filling medium by capillary phenomenon.

Also affixed to the substrate 130 of the presently preferred exemplary electronic data module 100 are at least one crystal 125 to at least provide a time base, and a battery 120. It can be readily appreciated that the substrate 130 of the exemplary electronic data module 100 may be a conventional printed circuit board or the like. In a further aspect of the exemplary electronic data module 100, the substrate 130 may be another semiconductor chip disposed on a printed circuit board that is affixed to the cavity created by the housing 160. In a yet another aspect, the substrate 130 may be a printed circuit board disposed on a top surface of another semiconductor chip, thereby creating a "semiconductor sandwich" in the cavity of the housing 160.

Figure 4A:
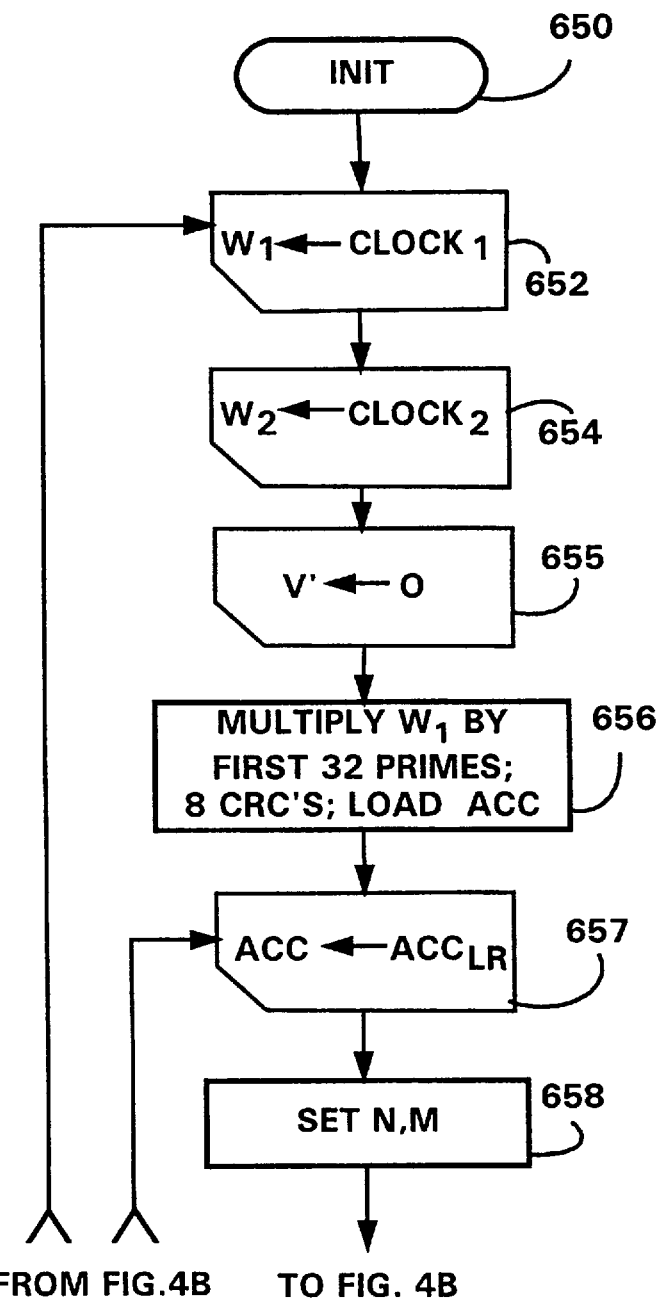
FIGS. 4A and 4B depict an exemplary flow diagram for accumulator initialization used in random number generation in accordance with the present invention.
Figure 4B:
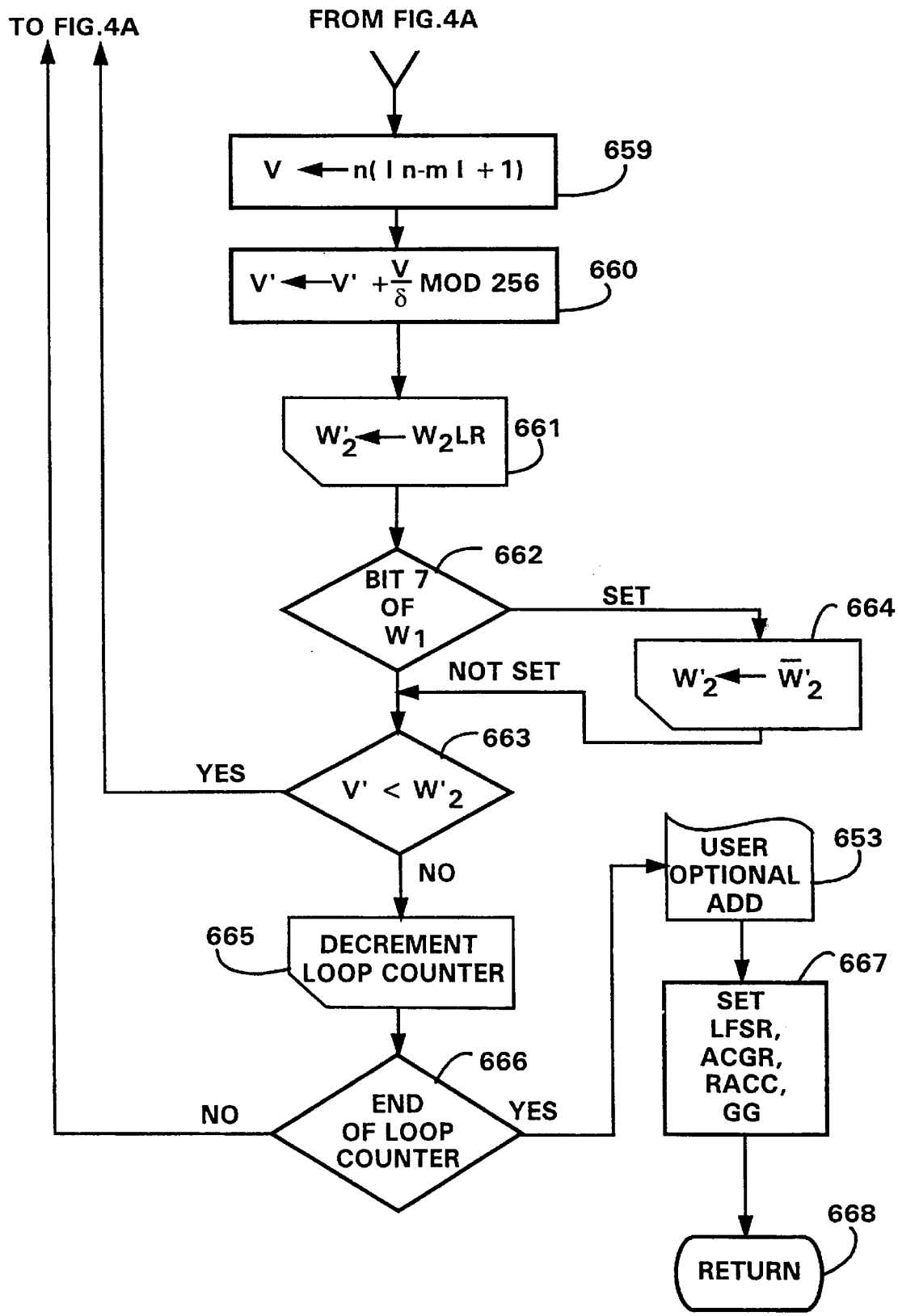

FIGS. 4A and 4B depict an exemplary flow diagram, called INIT, for creating the contents of a random number seed accumulator ("ACC") in accordance with the teachings of the present invention. The ACC, which in the exemplary embodiment is a 32-byte storage structure, may be implemented either in the data memory 515 or as a separate register. The steps comprising INIT may be implemented as either software, hardware, or firmware structures that may reside in the random number generator 560 (shown in FIGS. 2A and 2B). As will be described hereinbelow, the contents of the 32-byte ACC are initialized only once during the manufacture of a product or device embodying the present invention. It is also possible, however, to modify the ACC after the initialization, should a user desire to do so, by optionally adding, byte by byte, a pre-loaded value which may be entirely arbitrary, and may preferably comprise 32 bytes in size.

The ACC contents, which are sufficiently random to begin with, will be segmented regardless of the optional modification into sub-blocks which will be manipulated further based on random power-ups of the electronic data module 100 as will be described in detail in reference to FIG. 5.

Continuing to refer to FIGS. 4A and 4B, it is understood that the initial loading is done by the manufacturer, as shown in step 652 where W1 is loaded with a sample provided by an 8-bit clock counter, for example, counter 45, of the real-time clock 30 (shown in FIG. 1). A second work space W2 is subsequently loaded with another 8-bit clock counter sample, as indicated in step 654. In step 655, a dummy variable VPRIME is initialized to zero, for subsequent computations. Step 656 is a composite step involving several actions. First, the contents of W1 are multiplied by the first 32 primes which are preferably stored in the data memory 515 (shown in FIGS. 2A, 2B and 2C). That is, W1 is multiplied by 1, 3, 5, 7, 11, 13 et cetera, the multiplications being performed by a modulo 256 machine. Then, these 8-bit products are provided to a CRC32 generator, byte by byte, such that after every four bytes thus provided thereto, the CRC32 generates a 4-byte result. This 4-byte result is then loaded into the ACC. Accordingly, after 8 such CRC32 operations, a full complement of 32 bytes are loaded into the ACC.

Still continuing to refer to FIGS. 4A and 4B, the contents of the 32-byte ACC are left-rotated by one bit with wraparound so that 32 carry flags ("CF"), one for each of the 32 bytes, are obtained as indicated in step 657. Two additional variables are defined in step 658 based on the 32 carry flag bits obtained in step 657. One local variable is denoted by n that is set to be equal to the number of 1's among the 32 CF bits. The other local variable, m, is set to be equal to the number of 0's. If, on the other hand, m=32 (that is, all 32 CF bits are 0's only), then the value of n is set as 1 in the exemplary embodiment.

Still continuing to refer to FIGS. 4A and 4B, an intermediate value, V is computed as $\{n(|n-m|)+1\}$, as indicated in step 659. In step 660, the previously initialized VPRIME (in step 655) is then replaced by the value computed as $\{VPRIME+(V/\delta) \text{ MOD } 256\}$ where $\delta$ is a constant. Favorable results have been obtained in a presently preferred exemplary embodiment using a value of 7 for $\delta$.

In step 661, the contents of the second work space, W2, is left-rotated, depending upon the three least significant bits of the contents of W1. If all three are set, then W2 is left-rotated 7 times, and if none is set, it is not left-rotated at all. It should be noted herein that the resultant work space is denoted by W2PRIME, and these left-rotations are preferably circular rotations with wraparound.

In decision block 662, a decision is made based on if the bit 7 (b7) of the W1 work space is set. If b7 of W1 is set, then the contents of the second work space W2PRIME are complemented, as indicated in step 664. In step 663, which is reached either after complementing the contents of W2PRIME, or by taking the NOT SET path from decision step 662, the contents of the dummy variable VPRIME are compared against the contents of the W2PRIME. If the value of VPRIME is less than the value of W2PRIME, then the flow control is passed back to step 657 wherein the contents of ACC are left-rotated once again. On the other hand, if the value of VPRIME is NOT less than the value of W2PRIME, then a pre-initialized loop counter is decremented as provided in step 665. If a pre-determined end of loop counter is reached, by taking the YES path from step 666, the flow control is passed to an optional step 653 wherein a user may optionally add, byte by byte preferably, a pre-loaded value to the contents of the ACC. Since this step 653 is preferably designed to be optional, it may be bypassed in the initialization process that occurs during the manufacture of a product or device embodying the present invention. From the contents of the ACC, regardless of the optional byte-by-byte addition, a subset of the first 28 bytes of the 32-byte ACC are either segmented into or otherwise designated as a plurality of sub-blocks, for example, a linear feedback shift register ("LFSR") of 4 bytes; an additive cyclic group register ("ACGR") of 4 bytes; a random accumulator ("RACC") of 16 bytes; and another register denoted as "GG" of 4 bytes, as provided in step 667. The remaining four bytes may be either discarded or stored for any additional use. If, on the other hand, the NO path is taken from the decision block 666, then the control is passed back to step 652 wherein the first work space W1 get loaded again with an 8-bit clock counter sample to start the initialization process all over again. As stated in the foregoing, this process is done preferably only once during the initial manufacture of the device embodying the present invention. However, two implementational options exist after a user acquires the device: first, preferably, the INIT sub-process may be executed, starting with loading two clock samples into respective work spaces and manipulating the sample data until a 32-byte value is subsequently added to the preexisting contents of the ACC, as in step 656; or, second, the clock data loading and subsequent data manipulation may be bypassed. Either way, however, the user has the option of adding a pre-selected value into the contents of the ACC, as provided in step 653.

It should be noted in reference to the foregoing that the outer loop involving a loop counter (that is, taking the NO path from decision block 666 back to step 652 where the first work space W1 gets loaded with a fresh 8-bit clock counter sample) is executed a fixed number of times depending on the initial value of the loop counter. In the exemplary embodiment, this value is chosen to be 16. Also, the time period between successive outer loops may be seen to be dependent upon the number of times the inner loop (that is, by taking the YES path from decision block 663 to step 657 where the contents of the ACC are left-rotated) and the cycle time associated therewith. Because of the coupling of the inherent uncertainness of these control loops, the resultant contents of the 32-byte ACC at the end are not only extremely unpredictable and but have a statistically well-distributed hamming weight. It can be readily appreciated that even a one-bit difference in any of the initially loaded samples will be radically amplified at the end of process such that values with extreme unpredictability are obtained.

Figure 5:
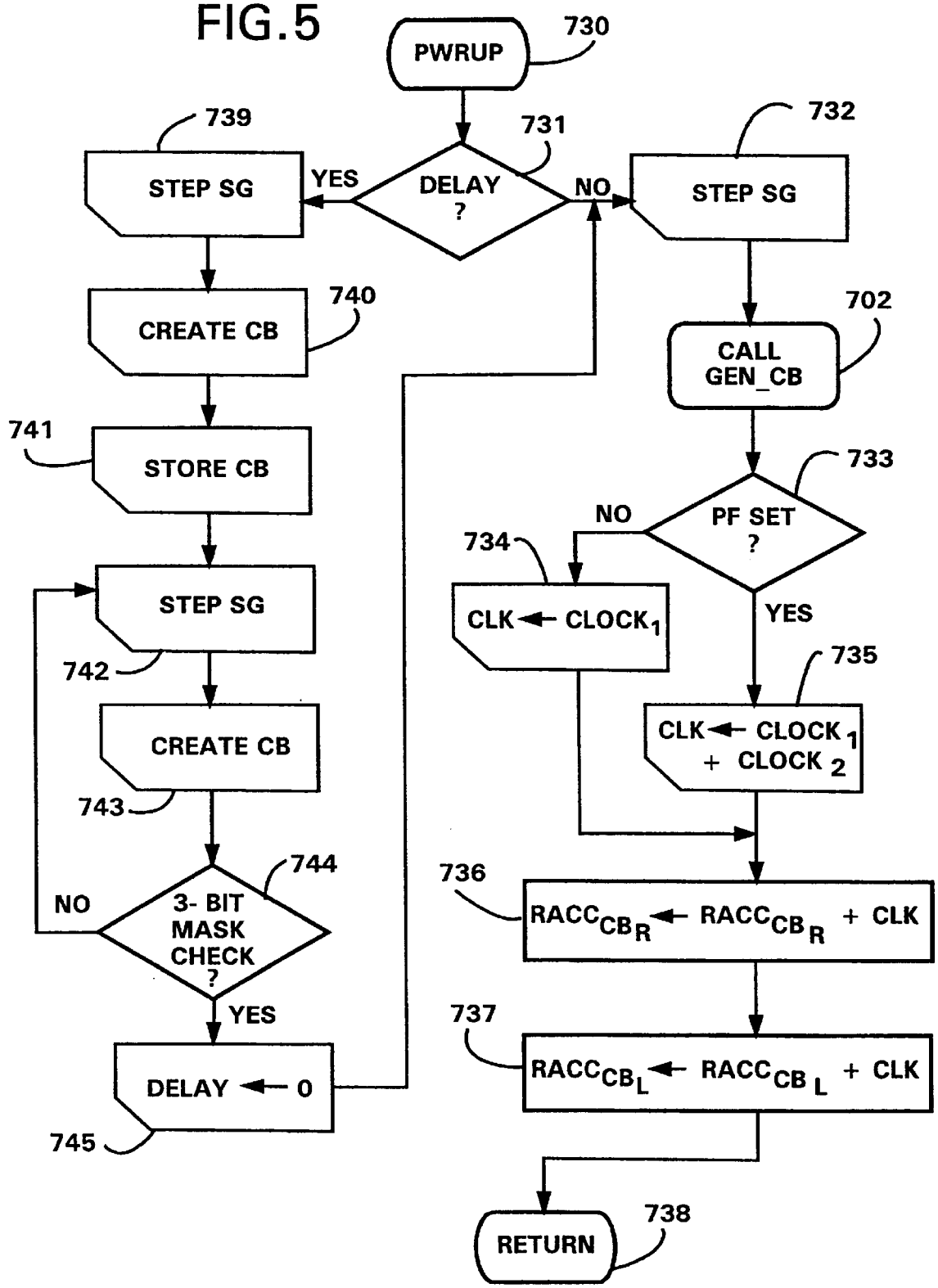
FIG. 5 depicts an exemplary flow diagram for enhancing entropy of the accumulator contents by coupling to external stochastic events such as random power-ups and power-downs of an exemplary electronic data module.

Referring now to FIG. 5, therein is depicted an exemplary flow diagram for further enhancing the entropy of the 16-byte RACC contents by coupling the manipulation thereof to external stochastic events such as random power-ups of the exemplary electronic data module 100 (shown in FIG. 3). The sub-process, labeled as PWRUP 730, immediately leads to a decision block 731 where a decision is made as to whether or not there should be a delay before the real-time clock counter is sampled. By taking the NO path therefrom, STEP SG 732 is entered. SG is a sequence generator that is a combination of the 404.1 byte LFSR and the 4-byte ACGR obtained in the INIT subprocess as described in the foregoing. Basically, stepping the SG involves two events: the cycling of the ACGR wherein the GG value, which is held as a constant, is added to the value of ACGR using modular arithmetic; and the cycling of the LFSR by one step. Then, by using a sub-process GEN_CB, a control byte ("CB") and associated flags are created in step 702. The GEN_CB 702 will be described in greater detail hereinbelow in specific reference to FIG. 6.

Continuing to refer to FIG. 5, the flow control is then passed to a decision block 733 where the status of one of the flags, Parity Flag ("PF"), is checked. This determination is employed in deciding how the 8-bit clock counter samples will be used in creating a work space called CLK, the contents of which will be subsequently used how the contents of the 16-byte RACC will be manipulated. If PF is set then by taking the YES path from decision block 733, the CLK space is loaded with the result obtained from adding one 8-bit clock counter sample to the next one by modular arithmetic, as indicated in step 735. On the other hand, if the NO path is taken from decision block 733, then the CLK space is loaded with just the first 8-bit clock counter sample. In either case, step 736 is subsequently entered wherein the contents in one of the bytes of the 16-byte RACC are replaced by that byte's original contents added to the contents of the CLK space by modular arithmetic. Which byte of the 16-byte RACC is chosen for this purpose is determined by the right nibble of the control byte CB generated by the sub-process GEN_CB in step 702. In analogous fashion, in step 737, the contents of another byte of the 16-byte RACC are replaced by that byte's original contents XOR'ed to the contents of the CLK space. This time, however, which byte is chosen is determined by the left nibble of the control byte generated by the sub-process GEN_CB.

Referring back to the decision block 731, by taking the YES path therefrom, the sequence generator is stepped in step 739 as described in the foregoing. Then, a control byte, CB is created in step 740 (much the same way as in GEN_CB 702) without considering any associated flags. The contents of the CB are stored in a predetermined location, as indicated in step 741. Subsequently stepping the sequence generator, as provided in step 742 and creating another control byte CB in step 743, a decision block 744 is entered. In decision block 744, arbitrarily selected 3 bits of the second CB generated in step 743 are compared with the same 3 bits of the stored CB in step 741. If the 3-bit mask matches, the delay is set to ZERO, as provided in step 745. Otherwise, the control is passed back to step 742 where the sequence generator is stepped again for producing another control byte.

Still continuing to refer to FIG. 5, after the delay is set to ZERO in step 745, the control is passed to step 732 for eventually replacing the contents of two bytes selected from the 16-byte RACC as described in the foregoing. It should be noted herein that although there is a possibility that the same two bytes may be selected for the aforementioned manipulation, that will not diminish the added entropy in the contents of the RACC. Accordingly, each time a power-up of the electronic data module, as contemplated in the present invention, is effectuated, the PWRUP 730 sub-process is executed thereby mixing additional randomization into the contents of the 16-byte RACC.

Figure 6:
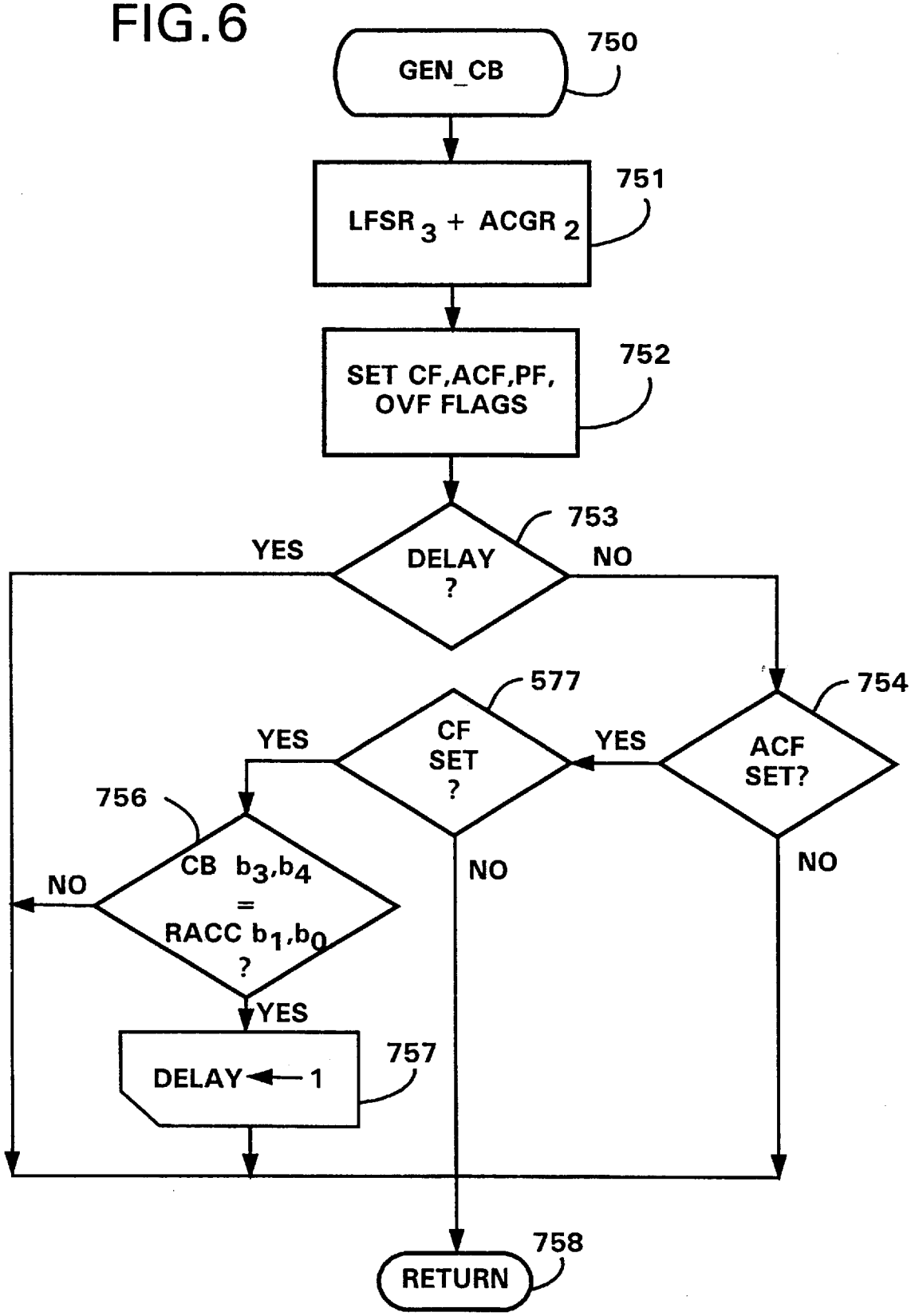
FIG. 6 depicts an exemplary flow diagram used generating a control byte on demand in accordance with the present invention.

FIG. 6 depicts an exemplary flow diagram used in the GEN_CB sub-process for generating a control byte on demand in accordance with the present invention. In step 751, the contents of the third byte of the LFSR are added to the contents of the second byte of the ACGR by modular arithmetic. The result is denoted as the control byte, CB.

Based on this modular arithmetic addition, flags such as, for example, a Carry Flag ("CF"), a Parity Flag ("PF"), an Auxiliary Carry Flag ("ACF") and an OVerflow Flag ("OVF") are set, as indicated in step 752. Subsequently, the delay status is checked in decision block 753 to determine if it is set or not. If the YES path is taken from the decision block 753, then the control is simply returned without further consideration of the flags set in step 752. On the other hand, if the delay is not set, then via successive determinations the respective status of the ACF and CF bits are checked to decide whether they are set or not, as provided in 754 and 755. If either is not set, then the control is simply returned again. If both are set, a further decision is made as provided in step 756 to check if bits 7 and 4 of the CB equal bits 1 and bits 0 of the 16-byte RACC. If they are not equal, the control is returned once again. Otherwise, the bits match between the CB and the RACC, and the delay flag is set as indicated in step 757. Subsequently, the control is returned to a location in the sub-process where GEN_CB is invoked. It can be appreciated that since only two bits are being compared between the CB and RACC, the delay flag is in general going to be set relatively rarely, and that the setting is based on multiple unpredictable events, such as, for example, the contents of the LFSR, or the ACGR and the contents of the lower order bytes in the RACC.

Figure 7A:
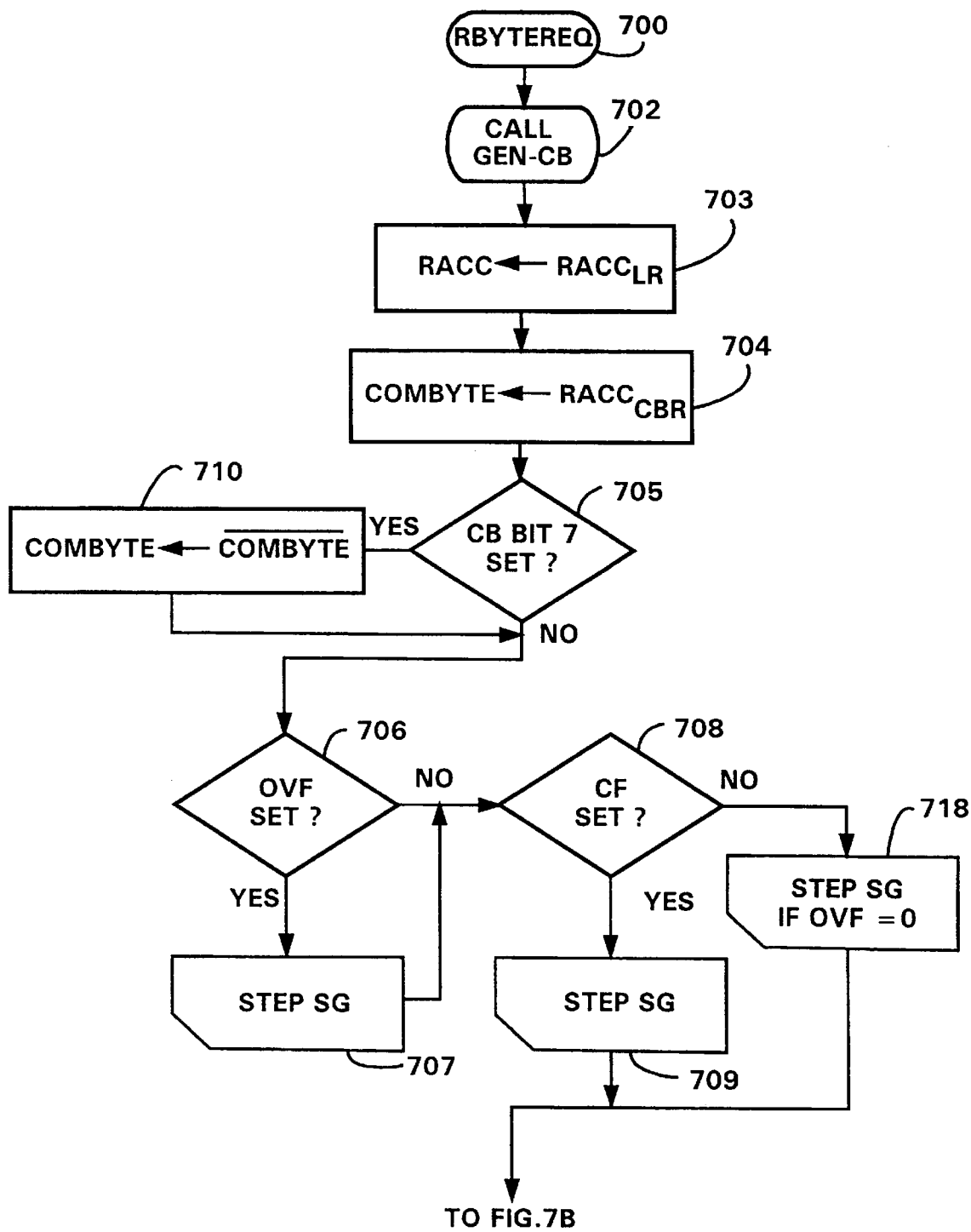

Referring now to FIGS. 7A and 7B, therein is depicted an exemplary flow chart for a random byte request sub-process, RBYTEREQ 700, that generates a random byte on demand. A control byte, CB, is created by invoking the GEN_CB sub-process in step 702. Based on the contents of the bit locations 4, 5, and 6 of the CB, the contents of the RACC are left-rotated, as indicated in 703. For example, if all the three bit locations (b4, b5, and b7) are set in the CB, then the RACC is left-rotated 7 times. In step 704, a work space, COMBYTE, is loaded with the contents of a selected byte of the 16-byte RACC. Which RACC byte is selected is dependent upon the contents of the right nibble of the CB, that is, b0–b3. Subsequently, the b7 location of the CB is checked in decision block 705 to determine if it is set or not. If b7 of the CB is set, then by taking the YES path therefrom, the contents of COMBYTE are complemented, as indicated in step 710. If the b7 is not set, or subsequent to the complementing of the COMBYTE, either at least one or two stepping operations of the sequence generator are taken (as indicated in steps 707, 709, and 718), depending upon whether the OVF and CF are set or not, as determined by the decision blocks 706 and 708, respectively. Accordingly, if both of the flags are set, then two stepping operations are undertaken via steps 707 and 709; and, if only one of the flags is set, or if neither of the flags is set, then, only one stepping operation is chosen. It is understood that the usage logic of these flags may be modified without substantially deviating from the teachings of the present invention. For example, the logic may also be implemented as follows: if both flags are set, then only one stepping operation is undertaken; otherwise, two stepping operations may be undertaken if neither flag is set, or, if either flag is set.

Continuing to refer to FIGS. 7A and 7B, a work space, denoted by CHOSEN_BYTE1, is loaded with the contents of a selected byte of the 4-byte LFSR. As indicated in step 711, the exact byte that is selected is dependent on the contents of the b0 and b1 locations of the COMBYTE. Analogously, a second work space, denoted by CHOSEN_BYTE2, is loaded with the contents of a selected byte of the 4-byte ACGR. As indicated in step 712, the exact byte that is selected is dependent on the contents of the b2 and b3 locations of the COMBYTE. The contents of these two work spaces, CHOSEN_BYTE1 and CHOSEN_BYTE2, are further manipulated depending upon whether the b4 of COMBYTE is set or not, as determined in decision block 713. It the b4 bit is not set, then the contents of the CHOSEN_BYTE1 are left-rotated, the rotation being dependent upon the b5, b6 and b7 of the CB, as indicated in step 714. Otherwise, the contents of the CHOSEN_BYTE2 are left-rotated, the rotation again being dependent upon the b5, b6 and b7 of the CB, as indicated in step 715. Subsequently, a random byte, RNDMBYTE is returned whose contents are the result of the XOR operation between CHOSEN_BYTE1 and CHOSEN_BYTE2, as provided in step 716.

Figure 8:
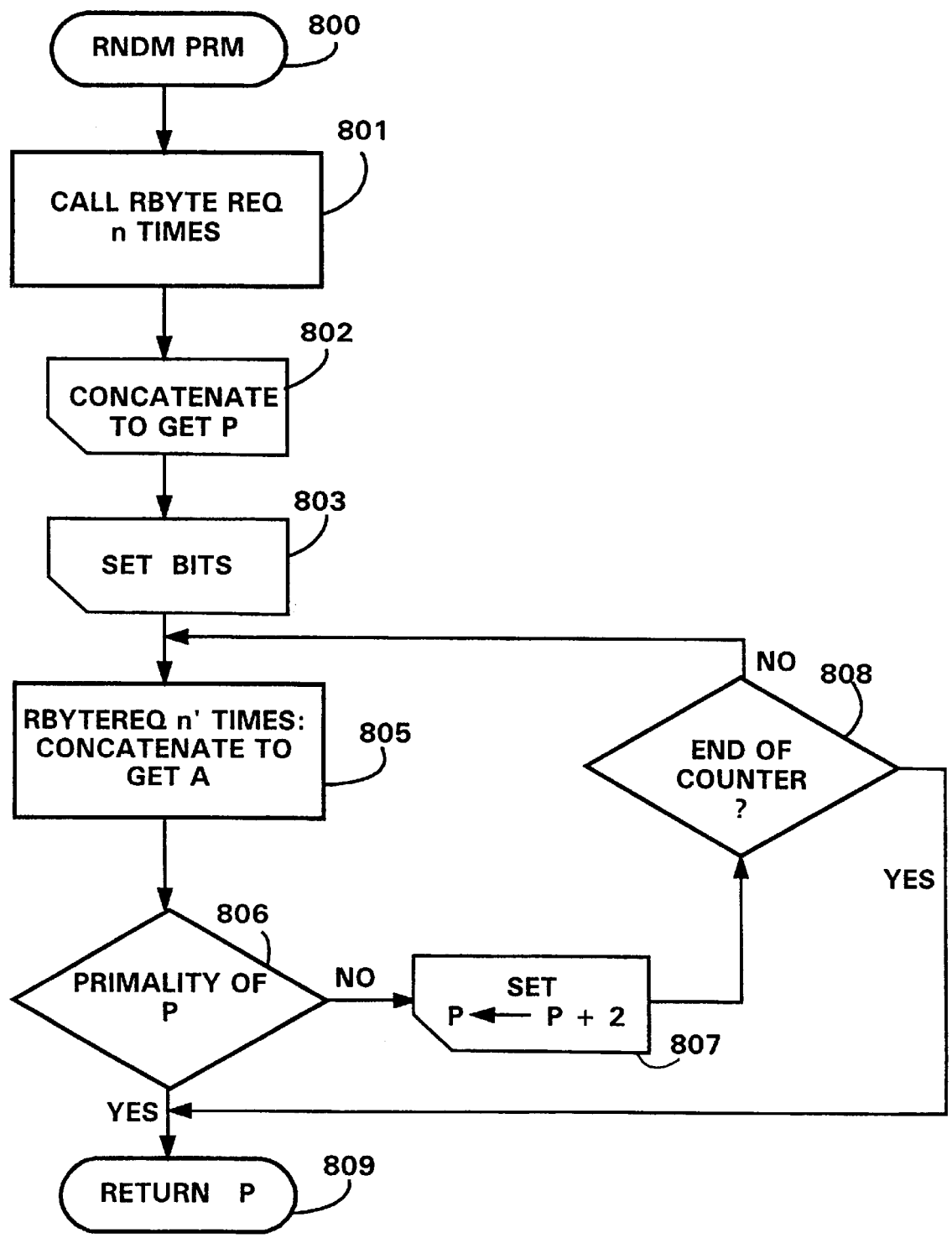
FIG. 8 depicts an exemplary flow chart for producing random numbers having large bit fields.

Referring now to FIG. 8, therein is depicted an exemplary flow chart utilized for a sub-process RNDMPRM, for producing prime random numbers having a large bit field, preferably about 512 bits or more. As will be seen below in the description regarding FIG. 9, these large random primes will be used in generating encryption key sets in accordance with the teachings of the present invention.

After entering the RNDMPRM sub-process at 800, the RBYTEREQ sub-process, described in detail hereinabove in specific reference to FIGS. 7A and 7B, is invoked several times, as provided in step 801. The exact number (denoted "n") preferably depends upon user needs, and in the exemplary embodiment, n equals 64, thereby producing 64 random bytes. These random bytes are then concatenated to produce a 512-bit number, which is denoted by P, as indicated in step 802. In accordance with the teachings of the present invention, the least significant bit and the two most significant bits of P are set, as shown in step 803.

Continunig to refer to FIG. 8, the RBYTEREQ subprocess is invoked again for a pre-determined number (denoted by "nprime") of times, as provided in step 805. It is preferred that nprime be less than n, and further, in the presently preferred exemplary embodiment, nprime is one less than n. These nprime bytes are then concatenated to produce another number, A, as also provided in step 805. In decision block 806, P is checked for primality by verifying the congruency of the following modular arithmetic equation: $\{A^{(P-1)} \bmod P \equiv 1\}$. If P is not prime, that is, A is a witness to the compositeness of P, then an even number, preferably 2, is added to P, as provided in step 807. Subsequently, a loop counter, preferably initialized to 50, is decremented and a pre-determined end of loop counter is tested in decision block 808. If the pre-determined end of loop counter is not reached, then the control is passed back to generating another A by sequentially invoking the RBYTEREQ sub-process as in step 805. On the other hand, if P satisfies the primality condition in step 806, the control is simply returned.

Figure 9:
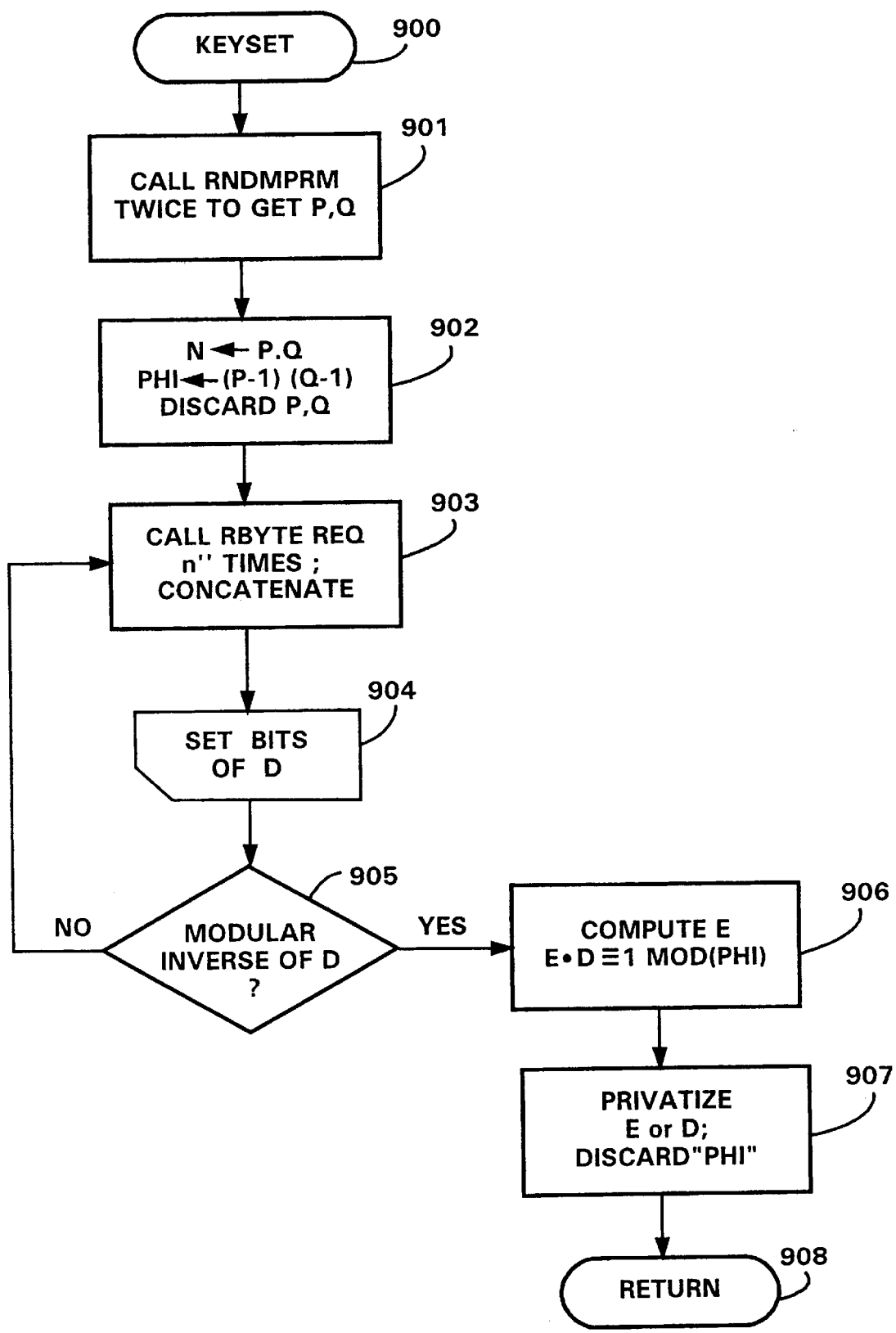
FIG. 9 depicts an exemplary flow chart for generating a set of encryption keys in accordance with the present invention.

FIG. 9 depicts an exemplary flow chart for a subprocess called KEYSET, for generating a set of encryption keys, usable preferably for the RSA encryption scheme. Upon invoking the KEYSET sub-process, two large random primes of 64 bytes, P and Q, are created by invoking twice the RNDMPRM sub-process described hereinabove. A modulus, N, and an intermediate value, PHI, are then computed as shown in step 902. N is equal to P times Q, whereas, PHI equals (P−1) times (Q−1). At this point, the user has an option to discard or otherwise dispose of the large random primes, P and Q. In step 903, the RBYTEREQ sub-process is sequentially invoked again for a number of times such that the number is greater than n, the number of bytes in P and Q. In the presently preferred exemplary embodiment, the RBYTEREQ sub-process is sequentially invoked 65 times and the random bytes obtained therefrom are concatenated so that a 65-byte number, called a first exponent, D, as shown in 903. In step 904, the most significant bit and the least significant bit of D are set. A second exponent, E, which is simply the modular inverse of D, is computed by verifying the congruency of the following equation: {E.D≡1 Mod (PHI)}, as provided in steps 905 and 906. It is understood that there are several known methods by which the congruency of this equation is verified, such as, for example, the extended Euclidian algorithm. In the exemplary embodiment, however, this computation is performed by using the binary extended greatest common divisor ("GCD") algorithm.

If, on the other hand, a modular inverse for D does not exist, then D is discarded or otherwise disposed of and the control passes back to creating a new D by invoking the RBYTEREQ sub-process as provided in step 903. Once E and D are computed, however, the intermediate value PHI can be discarded and either E or D may be privatized by storing one of the exponents (denoted as private exponent) in the secure data memory 515 (shown in FIGS. 2A, 2B, and 2C) such that access thereto is denied. On the other hand, any host or master, such as, for example, the host 10 (shown in FIG. 1) will be able to access the other exponent, denoted as public exponent and N. The encryption and decryption are straight-forward, as follows. If, for example, D is the private exponent and E is the public exponent, then the "encryption" key set comprises {E;N}, whereas the "decryption" key set comprises {D;N}. The host 10 can send an encrypted message to the electronic data module 100 (shown in FIG. 1) having the decryption key, D, stored internally thereto, by computing $M^E$ Mod N, where M denotes the plaintext. The data module 100, upon receiving the ciphertext, C, can decrypt by computing $C^D$ Mod N using the stored decryption key, D.

For providing a digital signature (S) to a message (M), S can be computed as {S=$M^D$ Mod N} by a sender possessing the electronic data module with the private exponent. The digital signature may then be transmitted either in an encrypted mode or in a non-encrypted mode. The signature from the sender may be verified by an intended recipient by first decrypting the encrypted S itself, if necessary. Then, by computing {$S^E$ Mod N} using the sender's public exponent, the recipient can see if it matches M, the message sent by the sender. If they match, then the signature is authentic, thereby precluding repudiation by the sender.

It can be readily appreciated by those skilled in the art that the present invention as described in detail hereinabove provides an individualized portable data carrier having a virtually impenetrable communication system that is well-suited for applications requiring is secrecy and authentication such as electronic-cash (e-cash) transactions. By providing a tamper-proof housing for the electronic data module, the privatized key exponent stored in the secure memory is unbreakable because of: (i) the extreme entropy admixed into the seed numbers that are used for generating key exponents and the associated modulus, and (ii) the inherent tremendous computational difficulty in computing a private exponent once its associated public exponent and the modulus are known.

Although a preferred embodiment of the method and apparatus of the present invention has been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims. For example, the method of generating large random prime numbers may also be used in other public-key cryptosystems, such as, for example, the knapsack systems and the ElGamal scheme. Further, although the presently preferred exemplary embodiment discloses that the two primes, namely, P and Q, are the same size, it is not required that this condition be satisfied in order to practice the present invention. In a similar fashion, a low-exponent RSA scheme may also be used in accordance with the present invention without having to compute one of the large-valued exponents.

What is claimed is:

1. An electronic data module, comprising:

a housing;

a substrate disposed in said housing; and a monolithic semiconductor chip affixed to said substrate,
   wherein said monolithic semiconductor chip includes circuitry for tracking a random event and for providing a random sample of data based upon the occurrence of said random event and a structure for operating a cryptographic algorithm using said random sample of data.

2. The electronic data module as recited in claim 1, wherein said housing further comprises:

a first conductive surface;

a second conductive surface; and an insulator, said insulator disposed between said first conductive surface and said conductive surface.

3. The electronic data module as recited in claim 1, wherein said structure comprises:

a plurality of memory locations for storing information based at least in part upon said random sample of data;

means for increasing entropy of the contents of a sub-group of said plurality of memory locations; and means for providing a segment of information upon demand, said segment of information being obtained from the contents of said sub-group of said plurality of memory locations.

4. The electronic data module as recited in claim 1, wherein said circuitry comprises:

a redundancy check generator; and a real-time clock having at least one counter, said at least one counter for providing at least one sample of information to said cyclic redundancy check generator pursuant to said random event.

5. A method of generating a two-key encryption key set comprising a private component and a public component, the method comprising the steps of:

generating a first random prime number;

generating a second random prime number;

producing a modulus by multiplying said first random number by said second random prime number;

generating a first exponent by solving a first modular arithmetic equation;

generating a second exponent, said second exponent being a modular inverse to said first exponent, by solving a second modular arithmetic equation; and securely storing at least one of said first exponent, said second exponent, and said modulus in at least one memory location, wherein each of said first and second random prime numbers is obtained by concatenating a first and second plurality of random bytes, respectively, and further wherein the contents of said random bytes are associated with a random event.

6. The method of generating a two-key encryption key set as recited in claim 5, further comprising the step of:

verifying that said first random number is a prime by solving a third modular arithmetic equation.

7. The method of generating a two-key encryption key set as recited in claim 5, further comprising the step of:

verifying that said second random number is a prime by solving a third modular arithmetic equation.

8. A method of generating a two-key encryption key set using an encryption circuit disposed in a portable electronic data module, the method comprising the steps of:

creating randomized contents in a data storage structure having a select length, said contents based in part upon a random power-up event associated with said portable electronic data module;

enhancing entropy of said data storage structure by manipulating the contents of said data storage structure;

producing a first and second prime number by repeatedly generating a first and second plurality of random bytes of data on demand, respectively, wherein the contents of said random bytes are determined at least in part by the contents of said data storage structure; and generating a first and second key based on said first and second prime numbers.

9. The method as recited in claim 8, further comprising the step of verifying the primality of each of said first and second prime numbers.

10. The method as recited in claim 9, further comprising the step of privatizing one of said first and second keys.

* * * * *

UNITED STATES PATENT AND TRADEMARK OFFICE
CERTIFICATE OF CORRECTION

PATENT NO. : 5,850,450
DATED : Dec. 15, 1998
INVENTOR(S) : Schweitzer et al.

It is certified that error appears in the above-identified patent and that said Letters Patent is hereby corrected as shown below:

Column 7, line 41        After "be"
                                       Delete --22--

Column 11, line 65       Replace "404.1 byte"
                                       With --4-byte--

Column 15, line 50       After "requiring"
                                       Delete --is--

Signed and Sealed this

First Day of June, 1999

*Attest:*

Q. TODD DICKINSON

*Attesting Officer*        *Acting Commissioner of Patents and Trademarks*